(12) United States Patent
Lenchner et al.

(10) Patent No.: US 11,763,692 B2
(45) Date of Patent: Sep. 19, 2023

(54) SECURE DELIVERY AND PROCESSING OF PAPER-BASED EXAM QUESTIONS AND RESPONSES

(71) Applicant: International Business Machines, Armonk, NY (US)

(72) Inventors: Jonathan Lenchner, Nairobi (KE); Reha Yurdakul, Istanbul (TR); Benjamin Joseph Mann, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 16/431,861

(22) Filed: Jun. 5, 2019

(65) Prior Publication Data
US 2020/0388179 A1 Dec. 10, 2020

(51) Int. Cl.
*G09B 7/00* (2006.01)
*G06F 21/32* (2013.01)

(52) U.S. Cl.
CPC .............. *G09B 7/00* (2013.01); *G06F 21/32* (2013.01)

(58) Field of Classification Search
CPC ... G09B 7/00; G09B 3/00; G09B 1/00; G09B 7/07; G09B 3/06; G06F 21/32
See application file for complete search history.

(56) References Cited

U.S. PATENT DOCUMENTS

| 5,195,033 A | 3/1993 | Samph et al. |
| 5,270,833 A | 12/1993 | Kubokawa et al. |
| 5,915,973 A | 6/1999 | Hoehn-Saric et al. |
| 5,947,747 A | 9/1999 | Walker et al. |
| 7,620,177 B2 | 11/2009 | Ibrahim et al. |

(Continued)

FOREIGN PATENT DOCUMENTS

| CN | 102799776 A | 11/2012 |
| KR | 20060125234 A | 12/2006 |
| WO | WO1998040862 A1 | 9/1998 |

OTHER PUBLICATIONS

M. Slagter, "UMich has a new way to reduce cheating on tests," Jul. 10, 2017 [Accessed Nov. 21, 2018] https://www.mlive.com/news/ann-arbor/index.ssf/2017/07/university_of_michigan_innovat.html 3 Pages.

(Continued)

*Primary Examiner* — Timothy A Musselman
(74) *Attorney, Agent, or Firm* — Shimon Benjamin; Otterstedt & Kammer PLLC

(57) ABSTRACT

Methods and systems for the secure delivery and processing of exam questions and responses. One or more exam questions and one or more identifiers of one or more designated individuals who are authorized to print the one or more exam questions are transported using a secure protocol. Biometric information is obtained from an individual requesting to print the one or more exam questions and information is read from an embedded tag that identifies a corresponding exam sheet as a unique exam sheet for a specified exam and that identifies that the specified exam is for a particular student. The specified exam is printed on the unique exam sheet in response to a first current time being in a printing time window TW1 and the biometric information from the individual matching biometric information of one of the one or more designated individuals.

20 Claims, 11 Drawing Sheets

(56) References Cited

U.S. PATENT DOCUMENTS

| | | |
|---|---|---|
| 7,886,029 B2 | 2/2011 | Rogers et al. |
| 2008/0293033 A1 | 11/2008 | Scicchitano et al. |
| 2018/0232830 A1 | 8/2018 | Dorenkamp et al. |
| 2020/0168346 A1* | 5/2020 | Solie ................... G16H 50/20 |

OTHER PUBLICATIONS

Crowdmark, "Using the Exam Matcher app with ID card integration." Dec. 12, 2016 [Accessed Nov. 21, 2018] https://crowdmark.desk.com/customer/en/portal/articles/2668716-using-the-exam-matcher-app-with-id-card-integration 6 Pages.

William Oeri, Schools calendar overhauled in new war against exam cheating, May 19, 2016, Downlaoded Jun, 5, 2019 From https://www.nation.co.ke/news/Tough-rules-to-stop-exam-cheats-unveiled/1056-3209416-1dxn99z/index.html, 4 Pages.

Roselyne Obala, Exam cheats be warned! A jail term of five years or a fine of Sh5 million, Downlaaded Jun. 5, 2019 From https://www.sde.co.ke/article/2001248626/exam-cheats-be-warned-a-jail-term-of-five-years-or-a-fine-of-sh5-million 1 Page Believed Published At Least as Early As Jun. 5, 2018.

How exam cheating can be reduced in Kenya, https://www.kenyaplex.com/resources/9921-how-exam-cheating-can-be-reduced-in-kenya.aspx Nov. 6, 2013 5 Pages Downloaded Jun. 5, 2019.

The Standard, How to beat Kenya's exam cheats in their game, https://www.standardmedia.co.ke/article/2000204248/how-to-beat-kenya-s-exam-cheats-in-their-game, Downloaded Jun. 5, 2019, 3 Pages Dated Jun. 7, 2016.

Peter Mell and Timothy Grance, The NIST Definition of Cloud Computing, NIST Special Publication 800-145, Sep. 2011, cover, pp. i-iii and 1-3.

* cited by examiner

SECURE DELIVERY AND PROCESSING OF PAPER-BASED EXAM QUESTIONS AND RESPONSES

BACKGROUND

The present invention relates to the electrical, electronic and computer arts, and more specifically, to a system for the secure delivery and processing of exam questions and responses.

Cheating on national exams is a problem throughout the world. In one type of cheating, printed exam questions and/or answers are obtained by the exam takers (exam participants) in advance of the exam. In another type of cheating, exams are modified after the exams are taken, either by the exam takers, a colluding educator, an exam proctor, and the like. In certain instances, the cheating is highly organized by cartels comprising examination officials, teachers, and the like. Conventionally, cheating is discouraged through the use of fines and incarceration, the use of secure shipping containers for exam questions and exam answer sheets, and the like. Nevertheless, episodes of cheating are persistently documented.

SUMMARY

Principles of the invention provide systems and methods for the secure delivery and processing of paper-based exam questions and responses. In one aspect, an exemplary method includes the step of transporting, using a secure protocol, one or more exam questions and one or more identifiers of one or more designated individuals who are authorized to print the one or more exam questions; obtaining biometric information from an individual requesting to print the one or more exam questions; reading information from an embedded tag that identifies a corresponding exam sheet as a unique exam sheet for a specified exam and that identifies that the specified exam is for a particular student; and printing the specified exam on the unique exam sheet in response to a first current time being in a printing time window TW1 and the biometric information from the individual matching biometric information of one of the one or more designated individuals.

In one aspect, a non-transitory computer readable medium comprises computer executable instructions which when executed by a computer cause the computer to perform a method comprising operations of: transporting, using a secure protocol, one or more exam questions and one or more identifiers of one or more designated individuals who are authorized to print the one or more exam questions; obtaining biometric information from an individual requesting to print the one or more exam questions; reading information from an embedded tag that identifies a corresponding exam sheet as a unique exam sheet for a specified exam and that identifies that the specified exam is for a particular student; and printing the specified exam on the unique exam sheet in response to a first current time being in a printing time window TW1 and the biometric information from the individual matching biometric information of one of the one or more designated individuals.

In one aspect, an apparatus comprises a memory; and at least one processor, coupled to said memory, and operative to perform operations comprising: transporting, using a secure protocol, one or more exam questions and one or more identifiers of one or more designated individuals who are authorized to print the one or more exam questions; obtaining biometric information from an individual requesting to print the one or more exam questions; reading information from an embedded tag that identifies a corresponding exam sheet as a unique exam sheet for a specified exam and that identifies that the specified exam is for a particular student; and printing the specified exam on the unique exam sheet in response to a first current time being in a printing time window TW1 and the biometric information from the individual matching biometric information of one of the one or more designated individuals.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

secure delivery of paper-based exam questions;

secure submission and transport of exam responses;

enhanced protection from the interception of exam questions en route from the exam creation server or system to the exam printing server;

empty answer sheets can only be printed on special, self-identifying exam paper;

exam questions and exam answer sheets can only be printed for an intended student in a time window that is specified in advance;

a completed exam answer sheet can only be submitted and scanned within a specified time window by an exam participant or other authorized individual;

exam answers can only be submitted from an official exam scanner; and enhanced protection from the interception of exam responses en route from the exam scanner to the exam result processor.

These and other features and advantages of the present invention will become apparent from the following detailed description of illustrative embodiments thereof, which is to be read in connection with the accompanying drawings.

DETAILED DESCRIPTION

Figure 1:
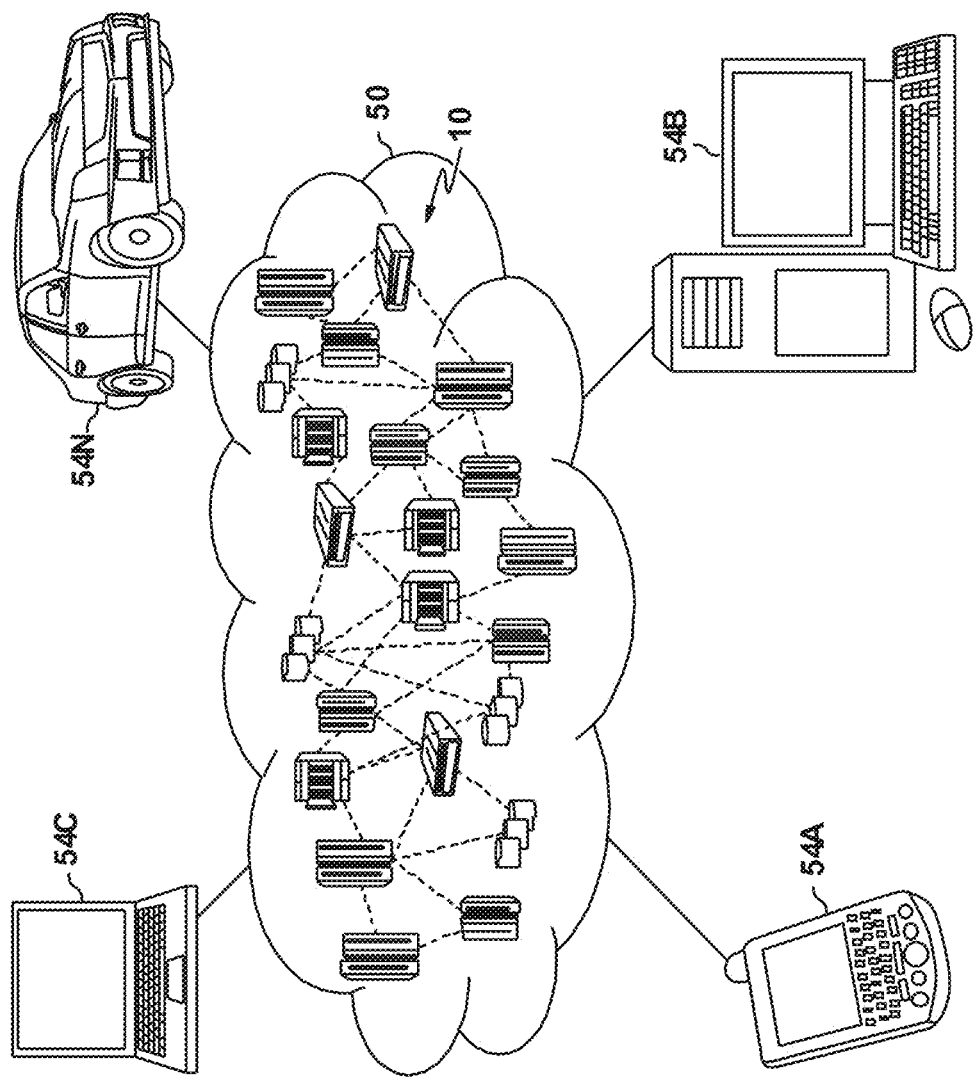
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
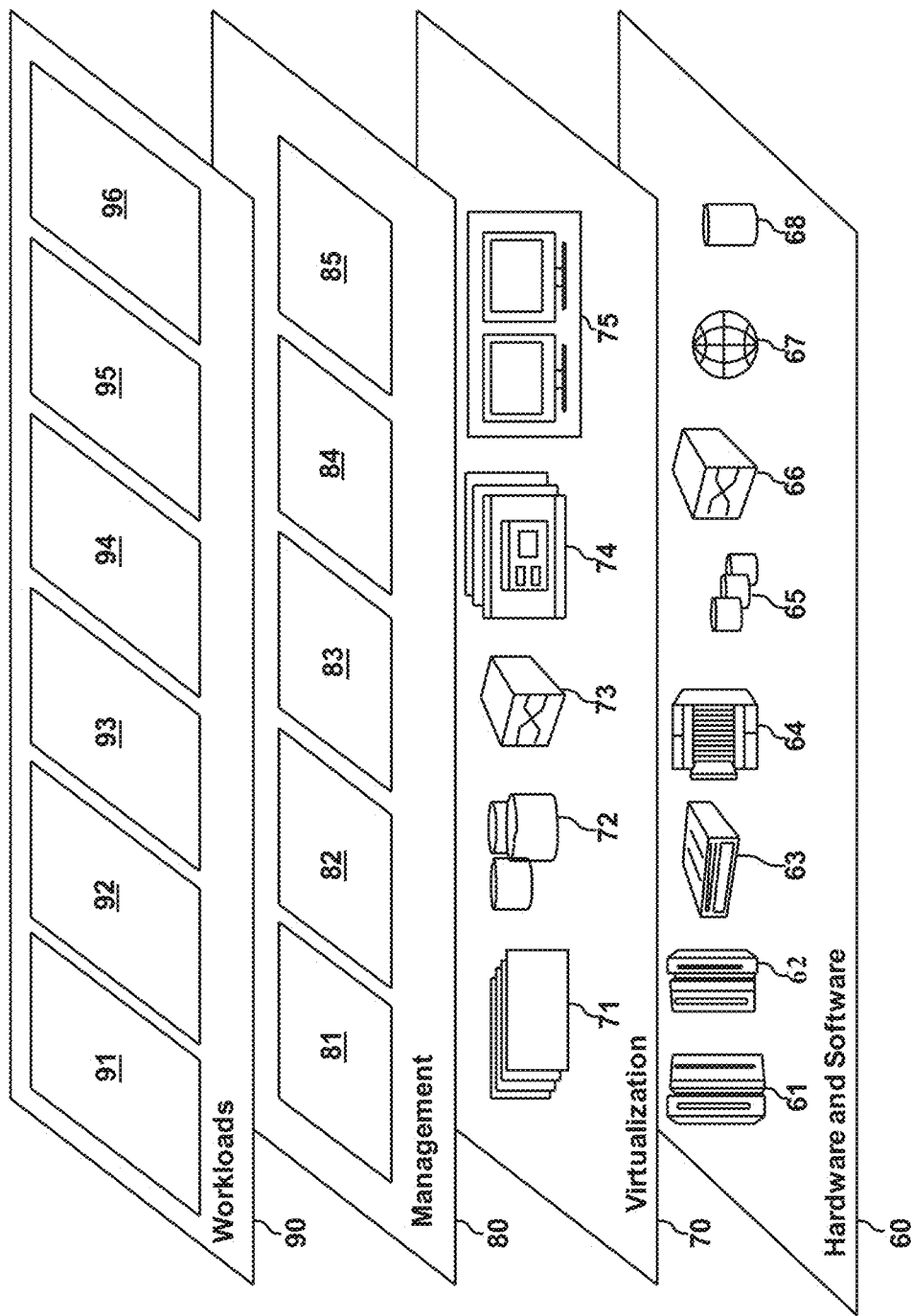
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and exam question and answer (response) transport and processing system 96. It is to be noted that simpler, non-cloud implementations are also contemplated and the disclosure of an embodiment utilizing cloud computing is exemplary and non-limiting.

Generally, system(s) and/or method(s) are disclosed for the secure delivery and processing of paper-based exam questions and exam responses. In one example embodiment, each sheet of exam paper contains an embedded radio frequency identification (RFID) tag that identifies the corresponding exam sheet as the unique exam sheet for a specified exam and that the corresponding exam is for a particular exam participant. The special exam paper is securely shipped to remote examination facilities via a secure carrier. In one example embodiment, information identifying the student, such as the student's name, is printed on the exam sheet. The use of the answer sheet with an embedded RFID tag ensures that exam questions can only be printed on the designated exam sheet. (In one example embodiment, the exam questions and the exam answer template are a single document. In one example embodiment, the exam questions and the exam answer template are printed on the same exam sheet. In one example embodiment, the exam questions and the exam answer template are printed on separate exam sheets.)

In one example embodiment, exam questions are securely transported from an exam compilation server, or a set of servers, to a smart printer using the secure sockets layer (SSL) protocol for printing within a designated printing time window TW1 and exam responses are scanned within a prescribed scanning time window TW2. For example, the printing time window TW1 may be the date-time span from 11 AM GMT (Greenwich Mean Time) to 11:30 AM GMT on Jun. 1, 2018 and the scanning time window TW2 may be the date-time span from 3 PM GMT to 3:30 PM GMT on Jun. 1, 2018. The exam responses are also transported using the SSL protocol. The use of SSL ensures that exam questions and exam answers cannot be intercepted en route from the exam creation server or system to the exam printing server, or from the exam scanner to the exam processing system.

In one example embodiment, the exam questions are sent to the print server along with the identifiers of designated people who are authorized to print them. For example, the exams can be sent to the corresponding exam participant, such as a student. The exams are then printable during the printing time window TW1. The user(s) designated to print the exam, such as the student (for an individual exam) or the exam proctor (for an individual exam or a batch of exams), are subjected to biometric authentication prior to printing the exams. For example, the user may submit fingerprints to a fingerprint reader of the printer server, or to an agent of the printer server. Thus, each exam, along with an exam answer sheet, can only be printed for the intended student in the designated printing time window TW1 by an authorized individual.

In certain scenarios, exam questions are submitted to the exam print server several days prior to the proctoring of the exam. For example, if internet reliability is an issue, the exams may be submitted repeatedly, as necessary, until the connectivity is established and the transfer of the exam to the remote exam facility is complete.

In one example embodiment, a completed exam is scanned by a designated scanner device within a scanning time window TW2. The scanner device has the ability to read the embedded RFID tag in the answer sheet and to obtain biometric information, such as a fingerprint, an iris scan, and the like, from the person submitting the exam answer sheet (such as the exam participant, an administrator, and the like). In one example embodiment, if the exam participant submits the exam answer sheet, the obtained biometric information is compared to the biometric information contained in the RFID tag. In one example embodiment, if the exam participant submits the exam answer sheet, the obtained biometric information is compared to biometric information contained in a remote exam vault that corresponds to the exam, in a remote identity vault (not shown), in the RFID tag, and the like. The biometric information may originate, for example, from an identity card or passport of the individual. The biometric information may be stored in its original form, or in a compressed form. For example, the system may utilize a hash function on the biometric information and compare it to the biometrics obtained from the individual submitting the exam, such as the exam participant, the exam proctor, or another authorized individual.

In this manner, it is ensured that the exam answer sheet can only be scanned within the scanning time window TW2 and only by an authorized individual, such as the exam participant. During scanning, a timestamp indicating the completion time of the scanning is also generated by the scanner device and is maintained with the scanned exam responses.

In one example embodiment, the scanned exam responses are transported to the exam server using the SSL protocol, largely ensuring that the scanning device is not spoofed by another device or that the scanned exam responses are intercepted or substituted for en route.

Figure 3:
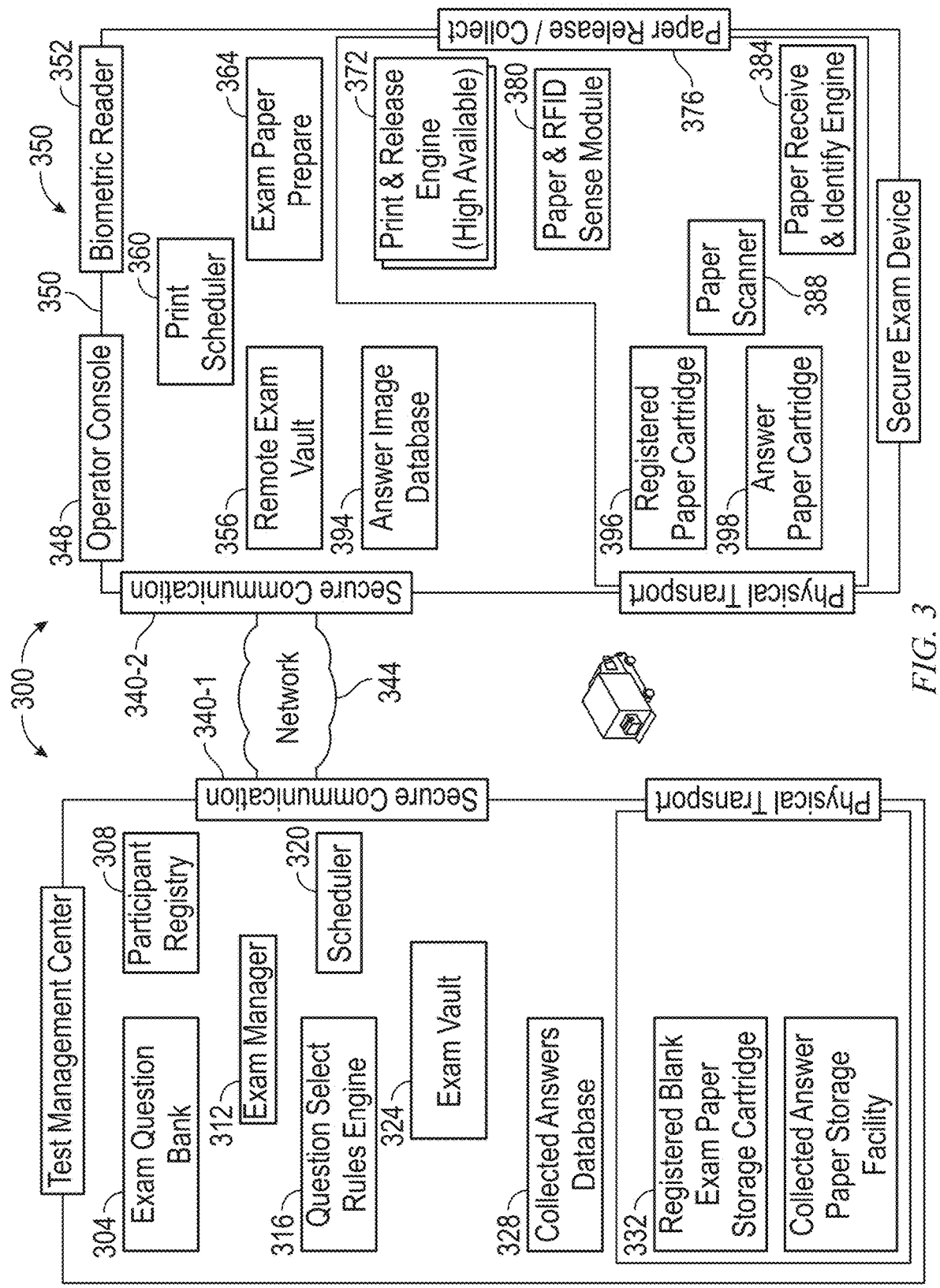
FIG. 3 is a block diagram of an example examination system for administering examinations, in accordance with an example embodiment.

FIG. 3 is a block diagram of an example examination system 300 for administering examinations, in accordance with an example embodiment. An exam question bank 304 is a database for maintaining a library of exam questions that may be selected and compiled into individual exams. A participant registry 308 is a database for maintaining the information pertaining to the identity of individuals who are registered to take an exam, who are in the process of taking an exam, or who have completed an exam (known as exam participants or students herein). An exam manager 312 is responsible for scheduling exams and compiling exam questions selected from the exam question bank 304 into individual exams. The questions may be selected by a question select rules engine 316 and assembled into exams that are stored in an exam vault 324 (a database). Questions may be grouped, for example, according to subject matter and difficulty, with a specified number of questions chosen at random representing the different subjects and difficulty levels.

In one example embodiment, a scheduler 320 is responsible for triggering compilation of exams and the transport of exams to a secure exam device 350. (The secure exam device 350 may be located at a remote testing facility.) The exams are transported via network 344, such as the Internet or a virtual private network (VPN), using secure communication interfaces 340-1, 340-2 (collectively known as secure communication interfaces 340 herein). The secure communication interfaces 340 utilize, for example, the SSL protocol to ensure the integrity of the transport of the exam questions and exam responses. The transported exams are temporarily stored in a remote exam vault 356 prior to printing.

In one example embodiment, blank exam sheets are stored in a registered blank exam paper storage cartridge 332 and are transported to a registered paper cartridge 396 in the secure exam device 350 at a remote facility. In one example embodiment, the registered blank exam paper storage cartridge 332 may simply be inserted into the secure exam device 350 without use of the registered paper cartridge 396. A biometric reader 352 verifies the identity of an individual prior to printing an exam from the remote exam vault 356. It is noted that exam questions and exam answers may be printed on the same sheet(s), on different sheets of the same document, or in different documents. In one example embodiment, exam paper with embedded RFID tags are used for both exam questions and exam answers, regardless of whether the exam questions and exam answers are printed on the same sheet(s), on different sheets of the same document, or in different documents.

A print scheduler 360 schedules (queues) exams for printing. In one example embodiment, if an authorized individual has not yet been authenticated, the examination system 300 requests the presence of an authorized individual in response to the print scheduler 360 indicating that it is time to print one or more exams. An operator console 348 enables an individual to identify and print an exam and to scan an answer sheet following the completion of an exam. The exam may be identified by the name of the exam participant and/or an exam identifier. The print and release engine 372 prints an exam based on the information from the RFID tag of the retrieved exam sheet that is read by a paper and RFID sense module 380. In one example embodiment, the information from the RFID tag is used to identify an exam participant and/or the exam in the remote exam vault 356 that is to be printed. In one example embodiment, the schedule maintained by the print scheduler 360 is used to identify the exam in the remote exam vault 356 that is to be printed and the identified exam is linked to the information stored in the RFID tag of the retrieved exam sheet. In one example embodiment, the RFID tag is printed on the exam sheet during the printing operation.

Once printed, a paper release and collect module 376 provides the printed exam to a user and, later, accepts the completed exam answer sheet for scanning by a paper scanner 388. Scanned answer sheets, accepted only upon presentation of valid biometric information on the part of the exam taker, the exam proctor, and/or another authorized individual, are sent electronically to the test management center, and the scanned exam answer sheets are temporarily stored in an answer paper cartridge 398 prior to transport to the test management center. The scanned image of the answer sheet and/or a summary or detailed account of the exam answers, are transported via the network 344 for storage in a collected answers database 328.

Figure 4A:
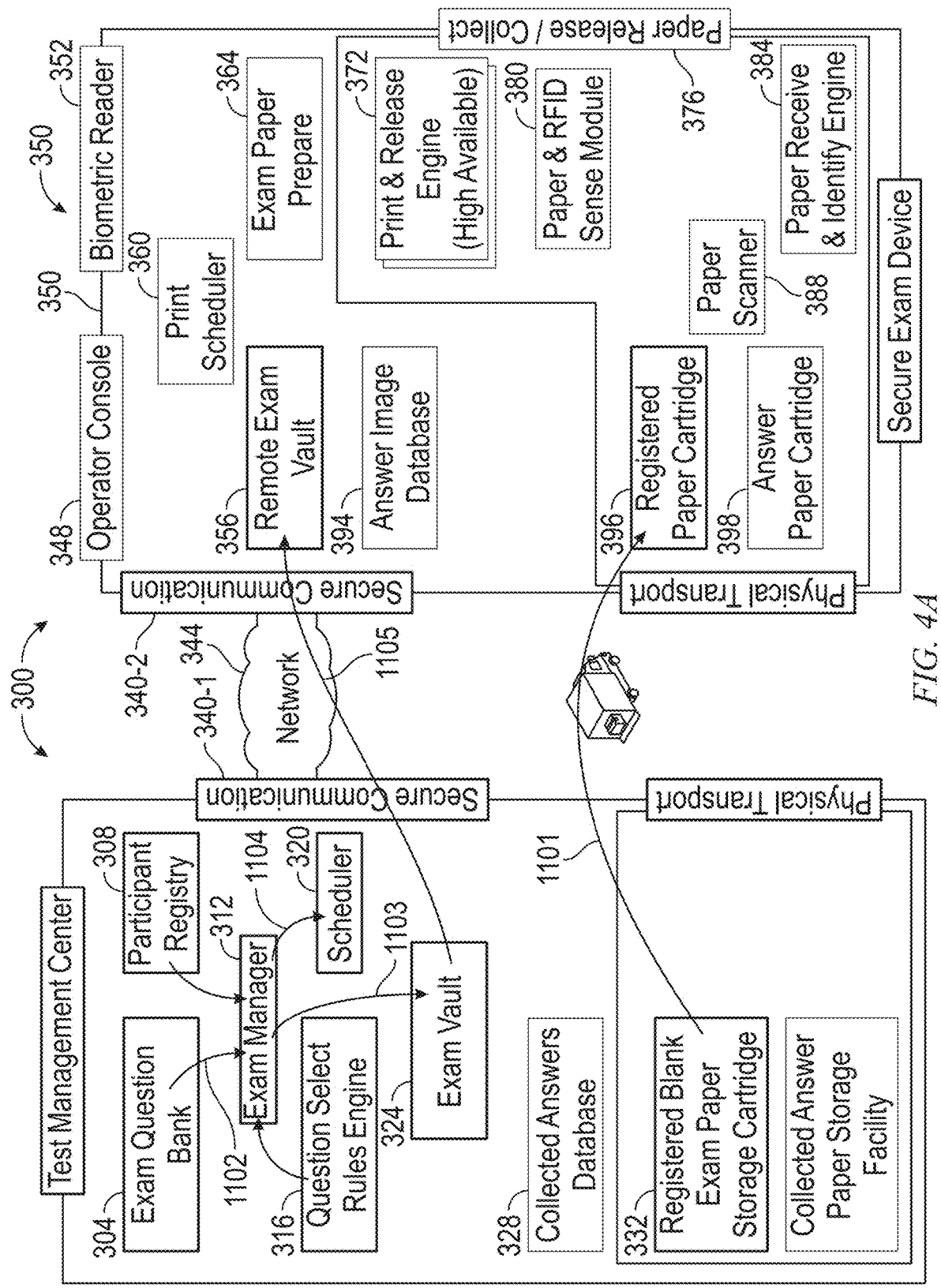
FIG. 4A illustrates an example workflow for a pre-exam process in the example examination system.

FIG. 4A illustrates an example workflow for a pre-exam process in the example examination system 300, in accordance with an example embodiment. During the pre-exam process, one or more registered blank exam paper storage cartridges 332 carrying exam paper embedded with RFID tags (or to be printed with RFID tags) are transported for storage and/or printing at a remote testing facility (operation 1101). One of the registered blank exam paper storage cartridges 332 is loaded into a slot of the secure exam device 350 at the remote facility, as described below in conjunction with FIG. 5. The secure exam device 350, also known as a smart printer herein, will only print exam questions on the appropriate exam sheet (as identified by the exam paper's RFID tag) or on a blank exam sheet where the RFID tag is printed at the time of printing the exam questions. The questions for each exam are then selected from the exam question bank 304 by question select rules engine 316 at the request of the exam manager 312 (operation 1102) and are assembled into exams for storage in the exam vault 324

(operation 1103). The assembled exam(s) are scheduled in the scheduler 320 for transport to, for example, a remote testing facility (operation 1104). In one example embodiment, the set of exam questions, the exam participant identity information, and the specification of the time windows TW1 and TW2 are transmitted to the secure exam device 350 (operation 1105). In one example embodiment, the exams are temporarily stored in the remote exam vault 356 after transmission.

Figure 4B:
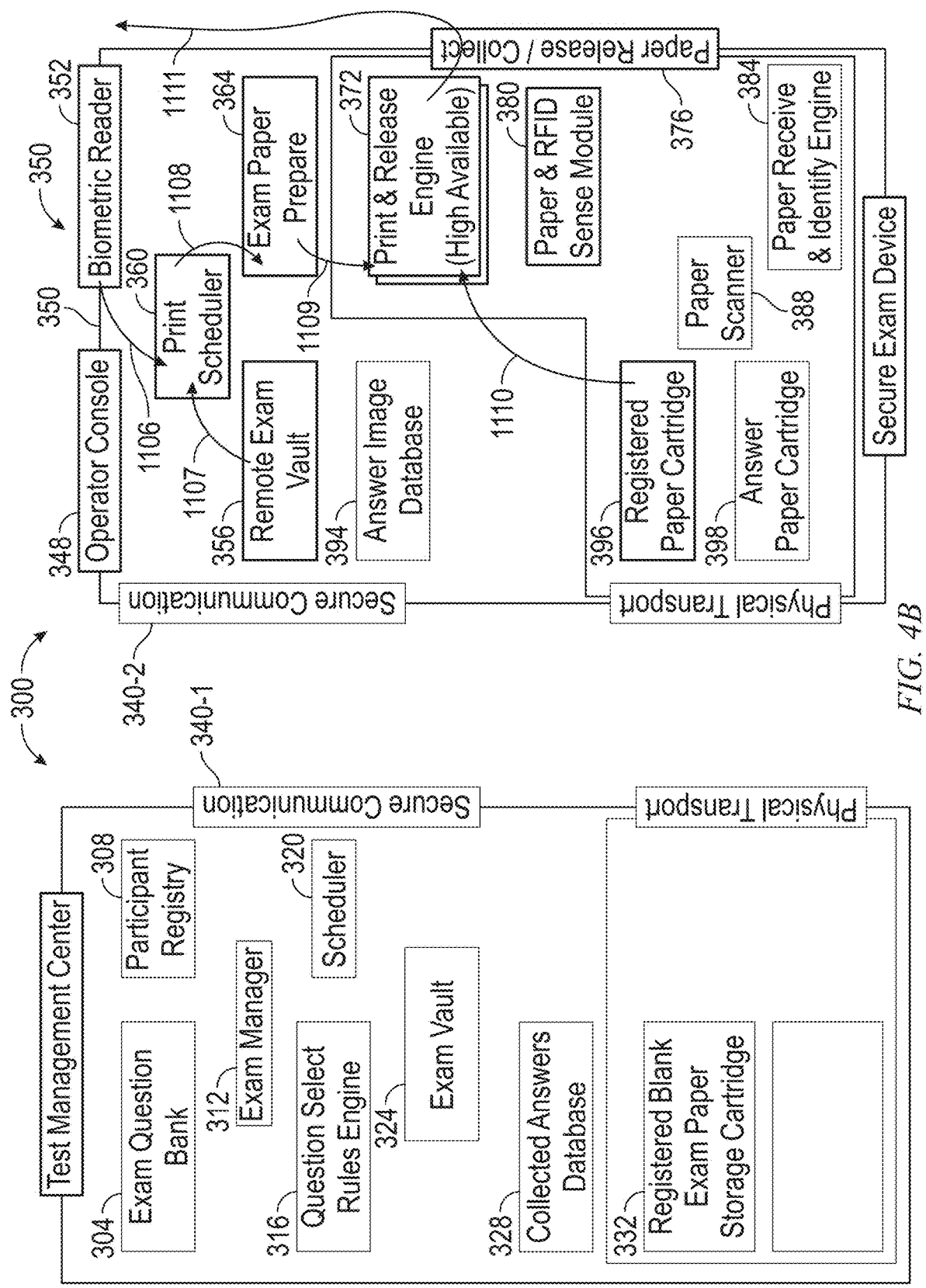
FIG. 4B illustrates an example workflow for administering an exam in the example examination system.

FIG. 4B illustrates an example workflow for administering an exam in the example examination system 300, in accordance with an example embodiment. During the exam process, the exams are printed and distributed to the exam participants. The exam may be printed by the exam participant, an administrator, an exam proctor, and the like. In one example embodiment, the individual requesting to print the exam submits biometric information, such as a fingerprint, to the biometric reader 352 (operation 1106). If the biometric reader 352 confirms the identity of the individual requesting to print the exam and the submission was performed during the printing time window TW1, an exam is retrieved from the remote exam vault 356 and submitted to the print scheduler 360 for printing (operation 1107). The particular exam may be identified by the individual via the operator console 348, may be inferred from the individual's biometric information, or may be identified by the information in the RFID tag embedded in the next sheet of blank paper (where the information either directly identifies the exam or indirectly identifies the exam using, for example, information identifying the exam participant). The print scheduler 360 submits the exam to the print and release engine 372 (operation 1109). The exam may be released to the print and release engine 372 at a scheduled time, in response to an exam sheet having a particular RFID tag being retrieved from the registered paper cartridge 396, in response to the authentication of the individual printing the exam, and the like. The exam sheet is queued up for printing by the exam paper prepare module 364 (operation 1108).

In one example embodiment, the next exam sheet is retrieved from the registered paper cartridge 396 (or the registered blank exam paper storage cartridge 332) (operation 1110). The RFID tag of the retrieved exam sheet is read by the paper and RFID sense module 380, the print and release engine 372 retrieves the exam corresponding to the identity information and prints the exam, and the printed exam is then provided via the paper release and collect module 376 (operation 1111). In one example embodiment, the next exam in the print queue is retrieved and printed along with the corresponding RFID tag. In one example embodiment, the next exam in the print queue is retrieved and printed; in addition, the RFID tag of the exam sheet is linked with the printed exam.

Figure 4C:
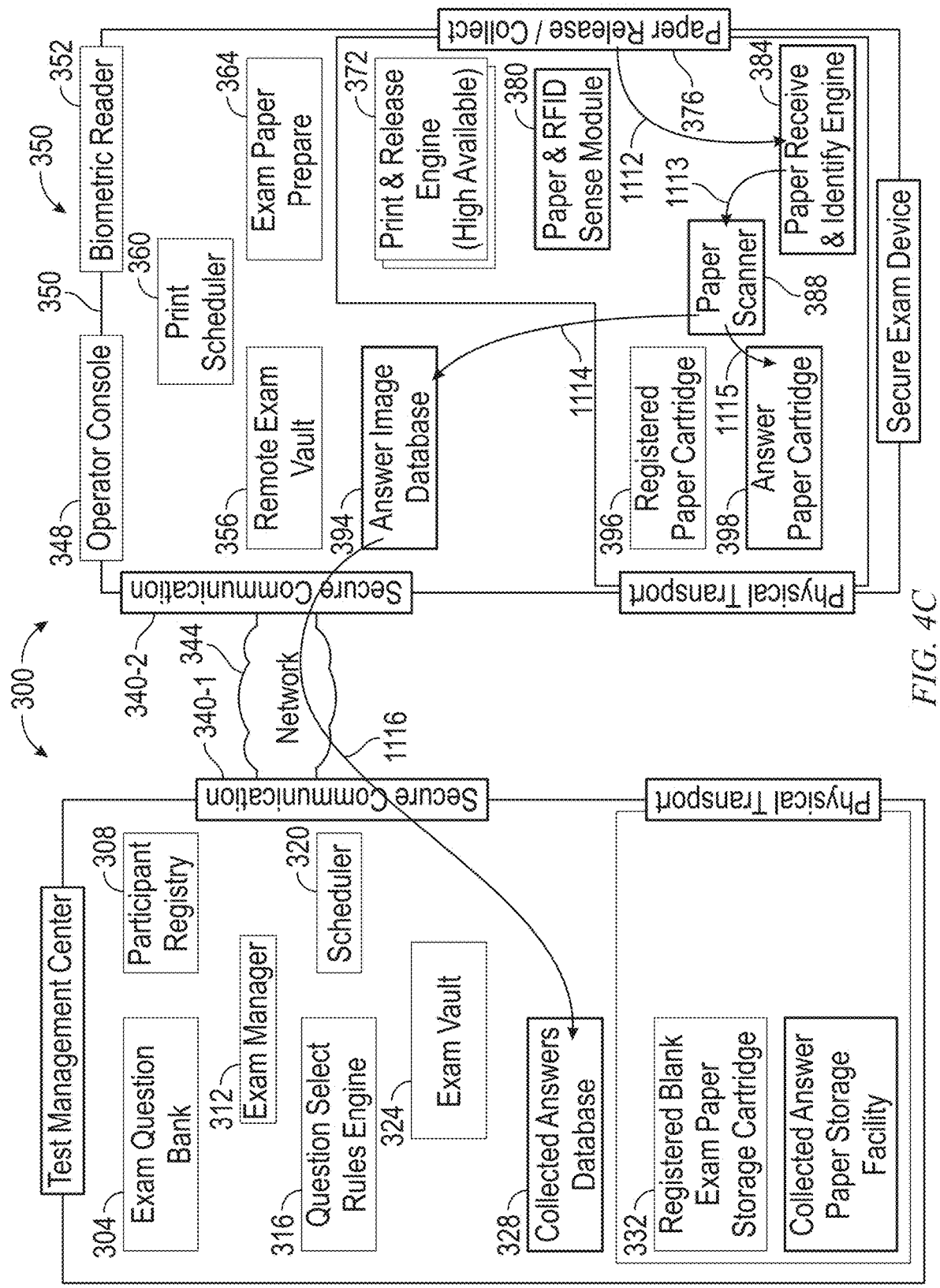
FIG. 4C illustrates an example workflow for scanning an exam in the example examination system, in accordance with an example embodiment.

FIG. 4C illustrates an example workflow for scanning an exam in the example examination system 300, in accordance with an example embodiment. During an after exam process, the exam participant, or an authorized administrator, submits biometric information to the biometric reader 352 (as illustrated in operation 1 of FIG. 4B). In one example embodiment, if the biometric reader 352 confirms the identity of the individual requesting to scan the exam and the submission was performed during the scanning time window TW2, the exam may be fed into the paper release and collect module 376 and the identity information is read from the RFID tag of the answer sheet by the paper and RFID sense module 380 (operation 1112). In one example embodiment, if the submission was performed during the scanning time window TW2, the exam may be fed into the paper release and collect module 376 and the identity information is read from the RFID tag of the answer sheet by the paper and RFID sense module 380 (operation 1112). If the identity of the individual requesting to scan the exam matches the identity of the individual obtained from the RFID tag (or is otherwise an authorized individual), as confirmed by the paper receive and identity engine 384, or obtained from an identity vault or other entity, the exam answer sheet is scanned by the paper scanner 388 (operation 1113) and an image of the scanned answer sheet, or a summary of the exam answers, together with an exam answer identifier is temporarily stored in an answer image database 394 (operation 1114). The image of the scanned answer sheet, or a summary of the exam answers, is transported with an identifier of the exam and/or answer sheet (such as the identity of the exam participant) via the network 344 to the test management center (operation 1116). In one example embodiment, the information is transported after scanning. In one example embodiment, the information is transported with a batch of exam answers after the scanning time window TW2 closes.

At the test management center, the digital form of the exam answer sheet is stored in the collected answers database 328. The physical answer sheet is loaded into the answer paper cartridge 398 (operation 1115) for transport to and storage at the main test facility.

Figure 5:
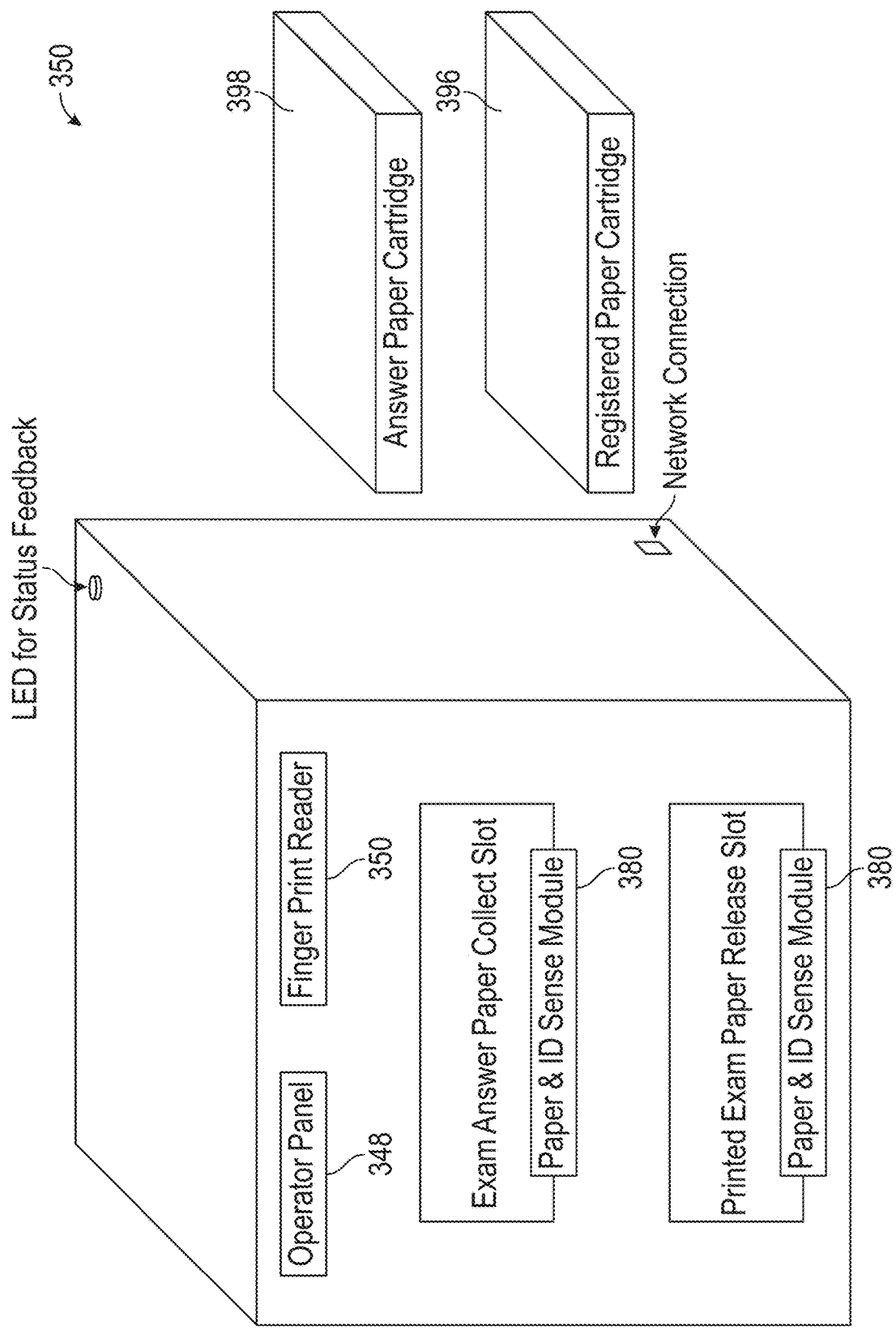
FIG. 5 illustrates an example secure exam distribution device, in accordance with an example embodiment.

FIG. 5 illustrates an example secure exam distribution device 350, in accordance with an example embodiment. In one example embodiment, blank answer sheets are stored at a remote facility in the registered paper cartridge 396 of the secure exam device 350. In one example embodiment, the registered blank exam paper storage cartridges 332 may be directly inserted into the secure exam device 350. As described above, operator console 348 enables an individual to identify and print an exam, or to identify and scan an exam answer sheet. A biometric reader 352 (fingerprint is a non-limiting example) verifies the identity of an individual prior to printing an exam from the remote exam vault 356 and prior to scanning an exam answer sheet. The print and release engine 372 prints exams based on the information from the RFID tag of the retrieved exam sheet read by the paper and RFID sense module 380, based on a schedule of the print scheduler 360, based on an entry via the operator console 348, based on the biometric information provided via the biometric reader 352, or any combination thereof. Scanned paper exam answer sheets are temporarily stored in an answer paper cartridge 398 prior to transport. Paper collection and release slots are each provided with a paper and ID sense module 380 in the illustrated embodiment.

Figure 6:
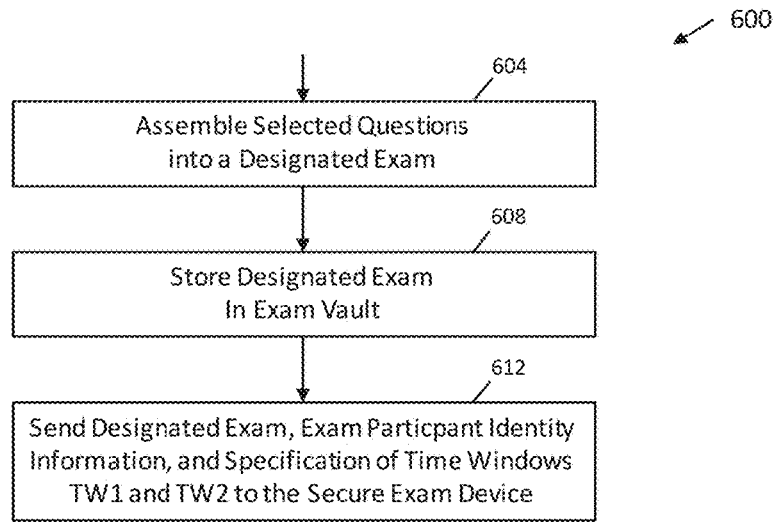
FIG. 6 is a flowchart for an example method for creating and transporting an exam in the example examination system, in accordance with an example embodiment.

FIG. 6 is a flowchart for an example method 600 for creating and transporting an exam in the example examination system 300, in accordance with an example embodiment. In one example embodiment, the method 600 may be implemented by the exam manager 312 and/or the question select rules engine 316. In one example embodiment, the questions for each exam selected from the exam question bank 304 by the question select rules engine 316 at the request of the exam manager 312 are assembled into an exam (operation 604) and stored in the exam vault 324 (operation 608). The set of exam questions, the exam participant identity information, and the specification of the time windows TW1 and TW2 are sent to the secure exam device 350 (operation 612).

Figure 7:
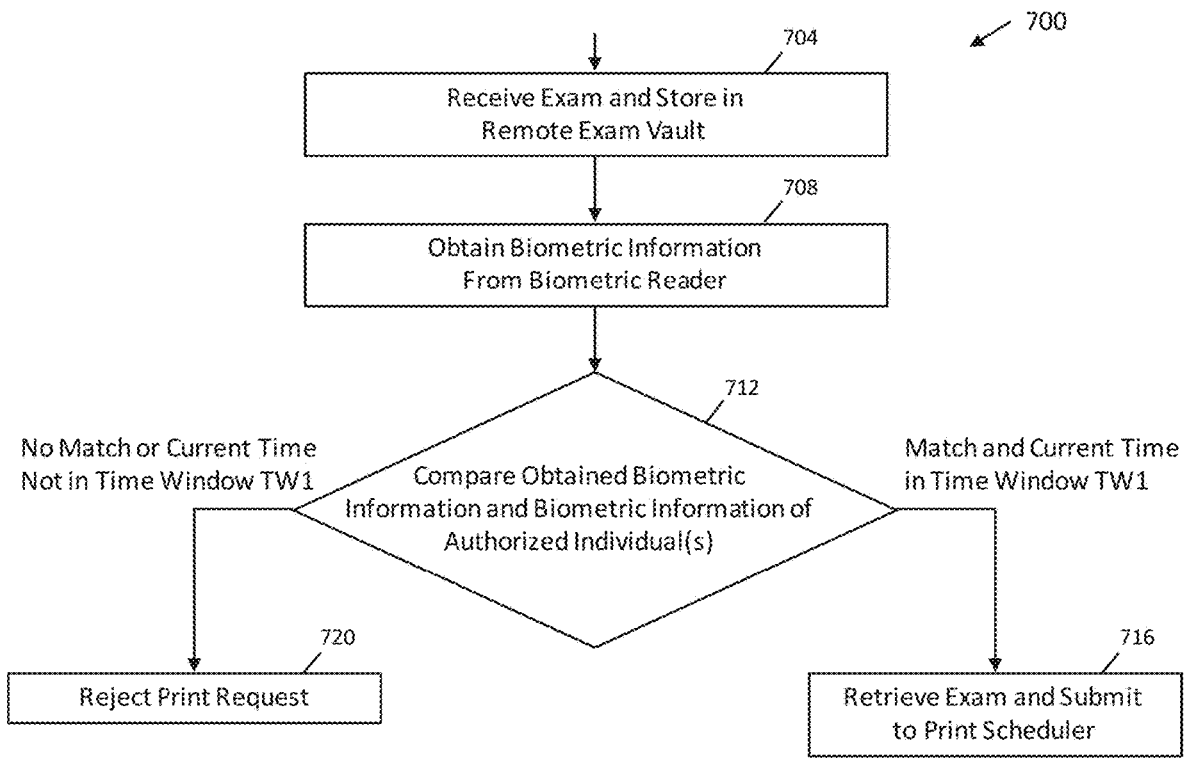
FIG. 7 is a flowchart for an example method for scheduling an exam for printing in the example examination system, in accordance with an example embodiment.

FIG. 7 is a flowchart for an example method 700 for scheduling an exam for printing in the example examination system 300, in accordance with an example embodiment. In one example embodiment, the method 700 may be implemented by the print and release engine 372. In one example embodiment, an exam is received and temporarily stored in the remote exam vault 356 (operation 704). Biometric information, such as a fingerprint, is obtained from the biometric reader 352 for an individual attempting to print an exam (operation 708). The biometric information is compared, for example, to the biometric information of an authorized individual (operation 712). If the biometric information confirms the identity of the individual requesting to print the exam and the submission was performed during the printing time window TW1, an exam is retrieved from the remote exam vault 356 and submitted to the print scheduler 360 for printing (operation 716); otherwise, the print request is rejected (operation 720). The particular exam may be identified by the individual via the operator console 348, may be inferred from the individual's biometric information, may be identified by the information in the RFID tag embedded in the blank paper (where the information either directly identifies the exam or indirectly identifies the exam using, for example, information identifying the exam participant), and the like.

Figure 8:
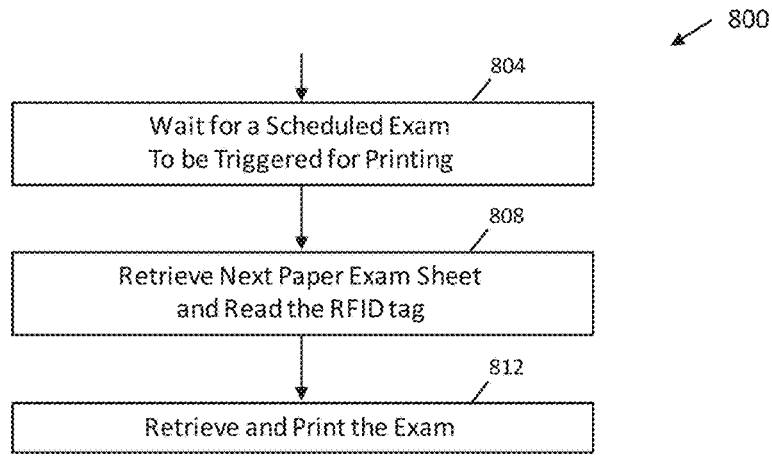
FIG. 8 is a flowchart for an example method for printing an exam in the example examination system, in accordance with an example embodiment.

FIG. 8 is a flowchart for an example method 800 for printing an exam in the example examination system 300, in accordance with an example embodiment. In one example embodiment, the method 800 may be implemented by the print and release engine 372. The print and release engine 372 waits for a scheduled exam to be triggered for printing, as described more fully above in conjunction with FIG. 4B (operation 804). In response to an exam being triggered for printing, the next exam sheet is retrieved from the registered paper cartridge 396 (or the registered blank exam paper storage cartridges 332) and the RFID tag of the retrieved exam sheet is read by the paper and RFID sense module 380 and sent to the print and release engine 372 (operation 808). The print and release engine 372 retrieves the exam corresponding to the identity information, as described more fully above in conjunction with FIG. 4B, and prints the exam (operation 812). The printed exam is then provided via the paper release and collect module 376.

Figure 9:
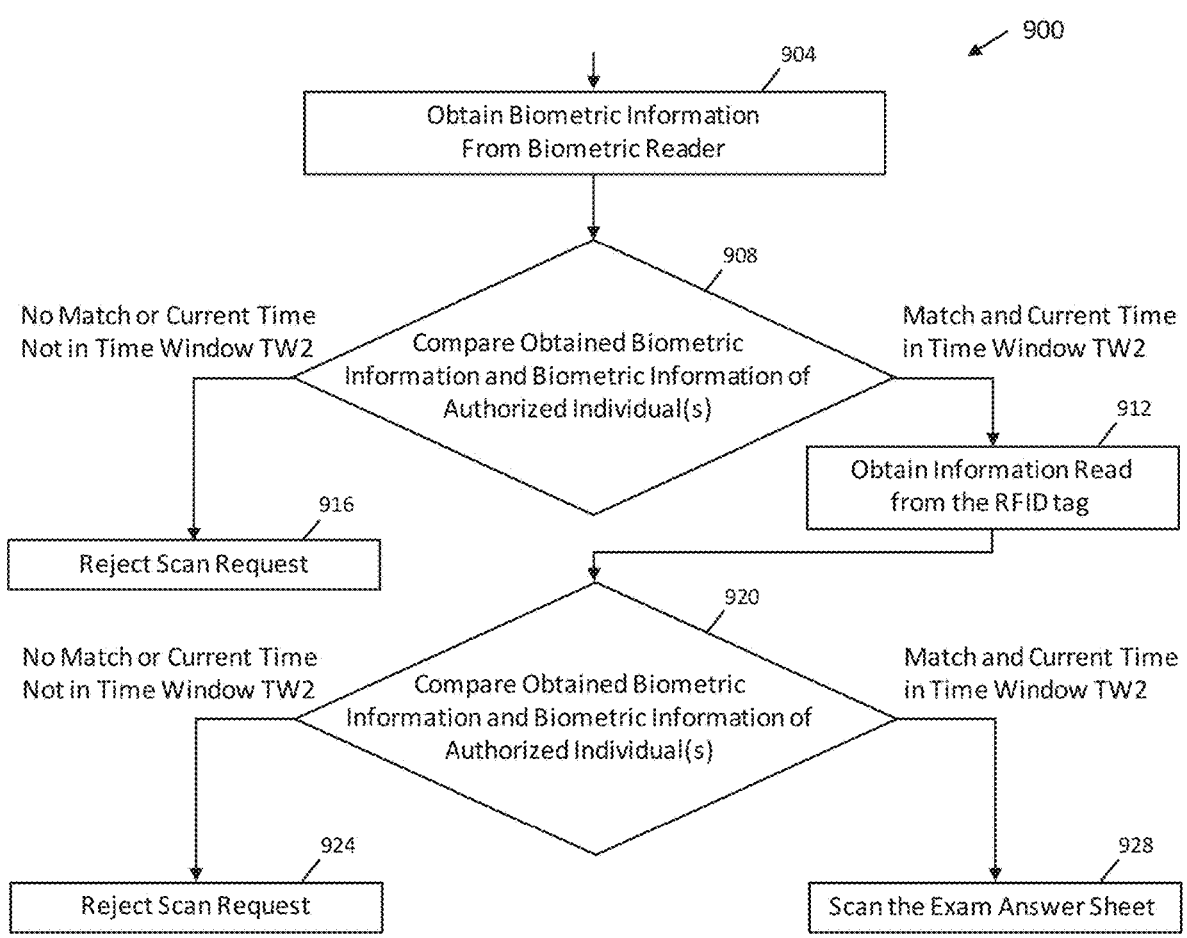
FIG. 9 is a flowchart for an example method for scanning an exam in the example examination system, in accordance with an example embodiment.

FIG. 9 is a flowchart for an example method 900 for scanning an exam in the example examination system 300, in accordance with an example embodiment. In one example embodiment, the method 900 may be implemented by the paper receive and identity engine 384. Biometric information, such as a fingerprint, is obtained from the examination taker and/or the exam proctor using the biometric reader 352 (operation 904). The biometric information is compared, for example, to the biometric information of an authorized individual (operation 908). If the biometric information confirms the identity of an individual scheduled to submit their completed exam during an appropriate scheduled time window TW2, the exam is fed into the paper release and collect module 376 and the identity information is read from the RFID tag of the answer sheet by the paper and RFID sense module 380 is obtained (operation 912) and the method 900 proceeds with operation 920; otherwise, the scan request is rejected (operation 916). The biometric information is then compared, for example, to the biometric information associated with the information read from the RFID tag (operation 920). If the identity of the individual requesting to scan the exam matches the identity of the individual associated with the RFID tag (or is otherwise an authorized individual), as confirmed by the paper receive and identity engine 384, the exam answer sheet is scanned by the paper scanner 388 (operation 928); otherwise, the scan request is rejected (operation 924). After scanning, an image of the scanned answer sheet, or a summary of the exam answers, is transported with an identifier of the exam and/or the exam answer sheet (such as the identity of the exam participant) via the network 344 to the test management center. As described above, in one example embodiment, the information is transported after scanning. In one example embodiment, the information is transported with a batch of exam answers after the scanning time window TW2 closes.

Figure 10:
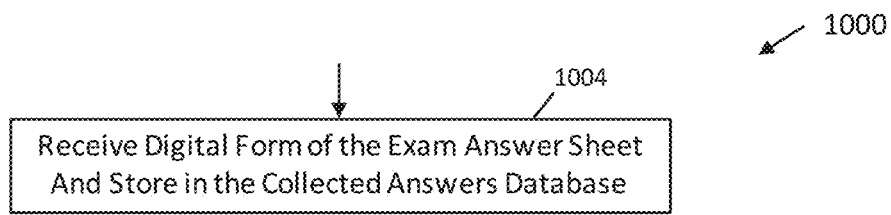
FIG. 10 is a flowchart for an example method for processing an exam answer sheet in the example examination system, in accordance with an example embodiment.

FIG. 10 is a flowchart for an example method 1000 for processing an exam answer sheet in the example examination system 300, in accordance with an example embodiment. In one example embodiment, the method 1000 may be implemented by the exam manager 312. In one example embodiment, the digital form of the exam answer sheet is received and stored in the collected answers database 328 (operation 1004).

Given the discussion thus far, it will be appreciated that, in general terms, an exemplary method, according to an aspect of the invention, includes the step of transporting, using a secure protocol, one or more exam questions and one or more identifiers of one or more designated individuals who are authorized to print the one or more exam questions 612; obtaining biometric information from an individual requesting to print the one or more exam questions 708; reading information from an embedded tag that identifies a corresponding exam sheet as a unique exam sheet for a specified exam and that identifies that the specified exam is for a particular student 808; and printing the specified exam on the unique exam sheet in response to a first current time being in a printing time window TW1 and the biometric information from the individual matching biometric information of one of the one or more designated individuals 812.

In one example embodiment, a non-transitory computer readable medium comprises computer executable instructions which when executed by a computer cause the computer to perform a method comprising operations of: transporting, using a secure protocol, one or more exam questions and one or more identifiers of one or more designated individuals who are authorized to print the one or more exam questions 612; obtaining biometric information from an individual requesting to print the one or more exam questions 708; reading information from an embedded tag that identifies a corresponding exam sheet as a unique exam sheet for a specified exam and that identifies that the specified exam is for a particular student 808; and printing the specified exam on the unique exam sheet in response to a first current time being in a printing time window TW1 and the biometric information from the individual matching biometric information of one of the one or more designated individuals 812.

In one example embodiment, an apparatus comprises a memory; and at least one processor, coupled to said memory, and operative to perform operations comprising: transporting, using a secure protocol, one or more exam questions and one or more identifiers of one or more designated individuals who are authorized to print the one or more exam questions 612; obtaining biometric information from an individual requesting to print the one or more exam questions 708; reading information from an embedded tag that identifies a corresponding exam sheet as a unique exam sheet for a specified exam and that identifies that the specified exam is for a particular student 808; and printing the specified exam on the unique exam sheet in response to a first current time being in a printing time window TW1 and the biometric information from the individual matching biometric information of one of the one or more designated individuals 812.

In one example embodiment, the transporting operation further comprises transporting a specification of the printing time window TW1 for printing the specified exam and a scanning time window TW2 for scanning the specified exam to a secure exam device 350. In one example embodiment, the obtained biometric information from the individual and the information read from the embedded tag are compared 712. In one example embodiment, biometric information from an individual requesting to scan one or more exam responses is obtained 904; and the one or more exam responses are scanned in response to the individual being authenticated and a second current time being within a scanning time window TW2 for scanning the specified exam 908, 912. In one example embodiment, a timestamp indicating a completion time of the scanning of the one or more exam responses is generated. In one example embodiment, the scanned one or more exam responses are linked in an unfalsifiable and immutable manner with an identifier for a corresponding exam participant and an associated scan time.

In one example embodiment, an additional copy of the specified exam is prevented from being scanned within the scanning time window TW2. In one example embodiment, a representation of the one or more exam responses is transported using the secure protocol from a smart scanner. In one example embodiment, transporting of the representation of the one or more exam responses is performed after scanning the specified exam or after the scanning time window TW2 closes. In one example embodiment, an exam paper contains the one or more exam questions and the one or more exam responses in a single document. In one example embodiment, the one or more exam questions are selected from an exam question bank 304 based on one or more question selection rules 316 and the one or more exam questions are compiled into the specified exam.

In one example embodiment, a schedule of a print scheduler 360 is queried using the information from the embedded tag of the unique exam sheet to identify a selected exam in a remote exam vault that is to be printed. In one example embodiment, a digital form of an exam answer sheet is stored in a collected answers database 328. In one example embodiment, the specified exam is identified by a user entry, based on the biometric information from the individual requesting to print the one or more exam questions, or based on the information read from the embedded tag of unique exam sheet where the information in the embedded tag either directly identifies the specified exam or indirectly identifies the specified exam using information identifying an exam participant. In one example embodiment, a specified exam is printed 812 with an identifier linking the unique exam sheet to an exam participant and a time when the specified exam was printed is recorded. In one example embodiment, an additional copy of the specified exam is prevented from being printed within the printing time window TW1. In one example embodiment, the secure protocol is a secure socket layer (SSL) protocol. In one example embodiment, the embedded tag is a radio frequency identification tag (RFID).

Figure 11:
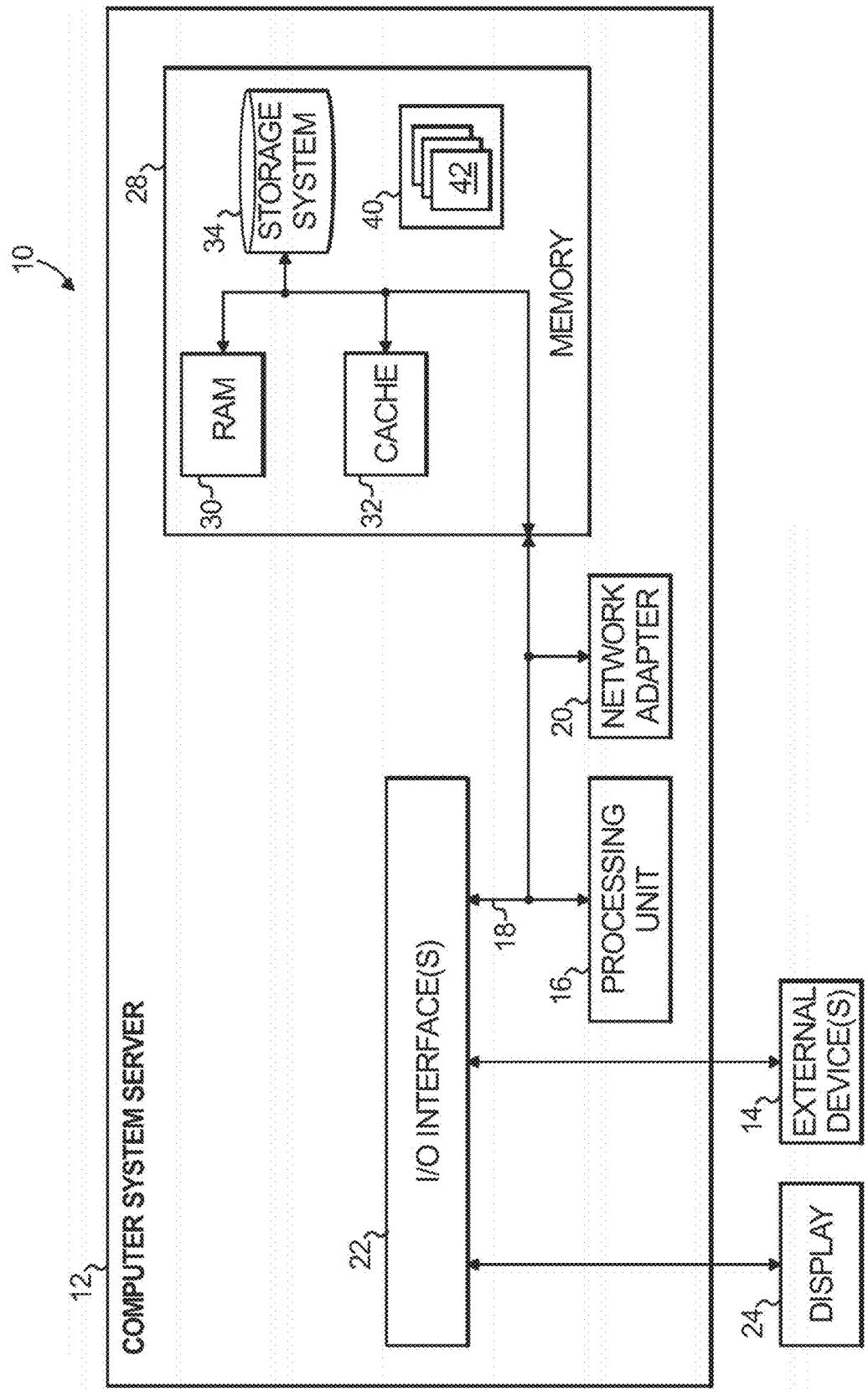
FIG. 11 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 11 depicts a computer system that may be useful in implementing one or more aspects and/or elements of the invention, also representative of a cloud computing node according to an embodiment of the present invention. Referring now to FIG. 11, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 11, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 11) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   transporting, using a secure protocol, one or more exam questions and one or more identifiers of one or more designated individuals who are authorized to print the one or more exam questions;
   obtaining biometric information from an individual requesting to print the one or more exam questions;
   reading, using an electronic embedded tag reader, information from an embedded tag that identifies a corresponding exam sheet as a unique exam sheet for a specified exam and that identifies that the specified exam is for a particular student; and
   printing, using an electronic printer, the specified exam on the unique exam sheet in response to a first current time being in a printing time window TW1 and the biometric information from the individual matching biometric information of one of the one or more designated individuals.

2. The method of claim 1, wherein the transporting operation further comprises transporting a specification of the printing time window TW1 for printing the specified exam and a scanning time window TW2 for scanning the specified exam to a secure exam device.

3. The method of claim 1, further comprising comparing the obtained biometric information from the individual and the information read from the embedded tag.

4. The method of claim 1, further comprising:
   obtaining biometric information from an individual requesting to scan one or more exam responses; and
   scanning the one or more exam responses in response to the individual being authenticated and a second current time being within a scanning time window TW2 for scanning the specified exam.

5. The method of claim 4, further comprising generating a timestamp indicating a completion time of the scanning of the one or more exam responses.

6. The method of claim 4, further comprising linking the scanned one or more exam responses in an unfalsifiable and immutable manner with an identifier for a corresponding exam participant and an associated scan time.

7. The method of claim 4, further comprising preventing a scanning of an additional copy of the specified exam within the scanning time window TW2.

8. The method of claim 1, further comprising transporting a representation of the one or more exam responses using the secure protocol from a smart scanner.

9. The method of claim 8, wherein transporting of the representation of the one or more exam responses is performed after scanning the specified exam or after the scanning time window TW2 closes.

10. The method of claim 1, wherein an exam paper contains the one or more exam questions and the one or more exam responses in a single document.

11. The method of claim 1, further comprising selecting the one or more exam questions from an exam question bank based on one or more question selection rules and compiling the one or more exam questions into the specified exam.

12. The method of claim 1, further comprising querying a schedule of a print scheduler using the information from the embedded tag of the unique exam sheet to identify a selected exam in a remote exam vault that is to be printed.

13. The method of claim 1, wherein a digital form of an exam answer sheet is stored in a collected answers database.

14. The method of claim 1, further comprising identifying the specified exam by a user entry, based on the biometric information from the individual requesting to print the one or more exam questions, or based on the information read from the embedded tag of unique exam sheet, where the information in the embedded tag either directly identifies the specified exam or indirectly identifies the specified exam using information identifying an exam participant.

15. The method of claim 1, the specified exam being printed with an identifier linking the unique exam sheet to an exam participant and recording a time when the specified exam was printed.

16. The method of claim 1, further comprising preventing a printing of an additional copy of the specified exam within the printing time window TW1.

17. The method of claim 1, further comprising scanning the one or more exam responses, evaluating the scanned exam responses and generating a computerized score for the specified exam.

18. The method of claim 1, wherein the embedded tag is a radio frequency identification tag (RFID).

19. A non-transitory computer readable medium comprising computer executable instructions which when executed by a computer cause the computer to perform a method comprising operations of:
   transporting, using a secure protocol, one or more exam questions and one or more identifiers of one or more designated individuals who are authorized to print the one or more exam questions;
   obtaining biometric information from an individual requesting to print the one or more exam questions;
   reading, using an electronic embedded tag reader, information from an embedded tag that identifies a corresponding exam sheet as a unique exam sheet for a specified exam and that identifies that the specified exam is for a particular student; and
   printing, using an electronic printer, the specified exam on the unique exam sheet in response to a first current time being in a printing time window TW1 and the biometric information from the individual matching biometric information of one of the one or more designated individuals.

20. An apparatus comprising:
   a memory; and
   at least one processor, coupled to said memory, and operative to perform operations comprising:
   transporting, using a secure protocol, one or more exam questions and one or more identifiers of one or more designated individuals who are authorized to print the one or more exam questions;
   obtaining biometric information from an individual requesting to print the one or more exam questions;
   reading information from an embedded tag that identifies a corresponding exam sheet as a unique exam sheet for a specified exam and that identifies that the specified exam is for a particular student; and
   printing the specified exam on the unique exam sheet in response to a first current time being in a printing time window TW1 and the biometric information from the individual matching biometric information of one of the one or more designated individuals.

* * * * *